(12) United States Patent
McGlinchy

(10) Patent No.: US 6,912,767 B2
(45) Date of Patent: Jul. 5, 2005

(54) LAMINATED MUNTIN BAR METHOD

(75) Inventor: Timothy Bryan McGlinchy, Twinsburg, OH (US)

(73) Assignee: GED Integrated Solutions, Inc., Twinsburg, OH (US)

(*) Notice: Subject to any disclaimer, the term of this patent is extended or adjusted under 35 U.S.C. 154(b) by 17 days.

(21) Appl. No.: 10/693,034

(22) Filed: Oct. 24, 2003

(65) Prior Publication Data

US 2004/0083662 A1 May 6, 2004

Related U.S. Application Data

(62) Division of application No. 09/781,630, filed on Feb. 12, 2001, now Pat. No. 6,687,982.

(51) Int. Cl.[7] .......................... B21D 35/00; B21D 39/03
(52) U.S. Cl. ...................................... 29/469.5; 29/428
(58) Field of Search ............................... 29/469.5, 428, 29/429, 430, 458, 469, 527.2, 527.1, 791, 709, 711, 897.3, 897.31; 52/204.61

(56) References Cited

U.S. PATENT DOCUMENTS

| | | | |
|---|---|---|---|
| 3,434,901 A | 3/1969 | Griffiths et al. | |
| 4,381,726 A | 5/1983 | Hojberg | |
| 4,419,173 A | * 12/1983 | Akiyama et al. | ........... 156/470 |
| 4,530,195 A | 7/1985 | Leopold | |
| 4,546,723 A | 10/1985 | Leopold et al. | |
| 4,628,582 A | 12/1986 | Leopold | |
| 5,088,307 A | 2/1992 | Cole | |
| 5,105,591 A | 4/1992 | Leopold | |
| 5,165,208 A | 11/1992 | Lingemann | |
| 5,179,770 A | * 1/1993 | Block et al. | ................. 29/17.3 |
| 5,295,292 A | 3/1994 | Leopold | |
| 5,313,761 A | 5/1994 | Leopold | |
| 5,361,476 A | 11/1994 | Leopold | |
| 5,402,962 A | 4/1995 | Blaimschein | |
| 5,678,377 A | 10/1997 | Leopold | |
| 6,173,484 B1 | 1/2001 | McGlinchy et al. | |
| 6,244,012 B1 | 6/2001 | McGlinchy et al. | |

FOREIGN PATENT DOCUMENTS

| | | |
|---|---|---|
| DE | 3207298 | 7/1983 |
| DE | 593410 | 4/1994 |
| GB | 1473619 | 5/1977 |

* cited by examiner

Primary Examiner—John C. Hong
(74) Attorney, Agent, or Firm—Watts Hoffmann Co., LPA

(57) ABSTRACT

An exemplary embodiment of the invention concerns a process for forming an elongated strip for use in making two tone muntin bars. An elongated strip of muntin bar material is provided that has been treated on at least a portion of one side to define an exposed surface of a completed muntin bar fabricated from the muntin bar material. An elongated strip of covering material is also provided for controlled application onto a specified portion of a surface of the muntin bar material. The elongated strip of covering material includes an adhesive for adhering the covering material to the muntin bar material. The muntin bar material and the covering material are brought into contact with each other thereby causing the covering material to overlie and adhere to the muntin bar material.

24 Claims, 5 Drawing Sheets

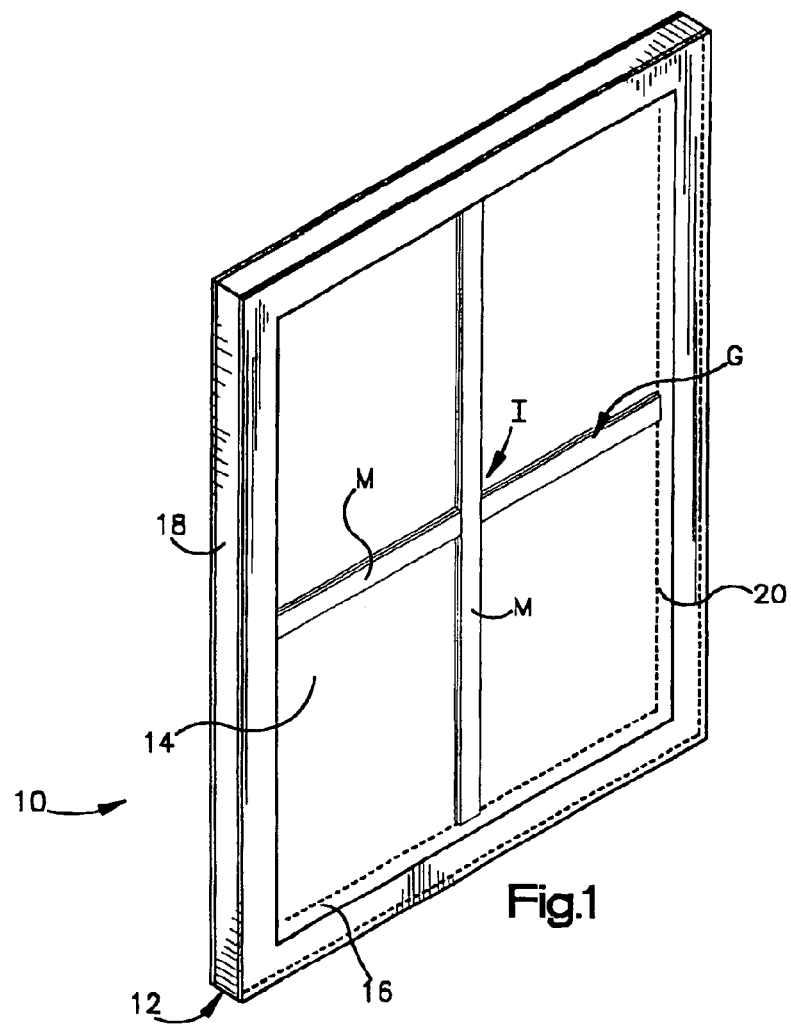
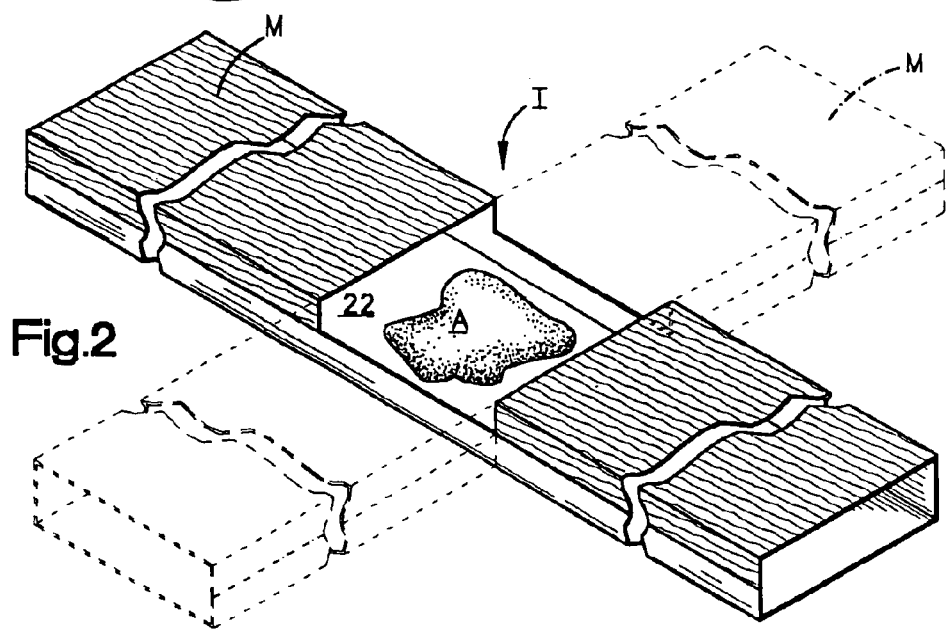

LAMINATED MUNTIN BAR METHOD

This application is a Divisional of Ser. No. 09/781,630, filed Feb. 12, 2001, and now U.S. Pat. No. 6,687,982.

FIELD OF THE INVENTION

The present invention concerns muntin bars used for separating window panes of large size into smaller size panes to enhance the appearance of a window.

BACKGROUND ART

Windows constructed from multiple glass panes utilized "muntins" or "muntin bars" to secure the edges of the individual glass panes within the window sash. In many windows, muntins formed distinctive grid patterns that are associated with architectural styles of buildings containing the windows.

Modern windows formed by insulating glass units utilize single glass lights separated by an insulating dead air space. Where a particular architectural "look" is desired, a grid of muntin bars is fixed in the dead air space between the glass lights to simulate a multi-pane window. Typical muntin bars for insulating glass units are formed from decoratively coated interfitted metal tubes. The grids are anchored to the insulating glass unit periphery.

Constructing muntin bar grids for insulating glass units has been a labor intensive process. As a consequence, manufacturing such units, and thus windows formed by the units, has been costly and inefficient. Some efforts to mechanize the manufacture of muntin grids have been made. Commonly owned U.S. Pat. No. 6,173,484 entitled "System for Fabricating Muntin Bars from Sheet Material" which issued Jan. 16, 2001 to McGlinchy et al. is an example of a system for automated fabrication of muntin bars. The subject matter of this patent is incorporated herein by reference. Commonly owned pending U.S. patent application Ser. No. 09/525,349 entitled "System for Fabricating Contour Muntin Bars from Sheet Material" is a second patent application to McGlinchy et al concerning automated fabrication of so-called contour muntin bars and the subject matter of this application is incorporated herein by reference.

The muntin bar stock is produced by roll forming decoratively coated sheet material such as aluminum or steel, in a known manner. Various sizes of the sheet material are used to form different size muntin bar stock. The roll forming machine has a series of rolls configured to form sheet material into elongated tubular muntin bar stock. A window manufacturer purchases the muntin bar stock size(s) needed to produce insulating glass units. Apparatus disclosed in the aforementioned patent application also cuts the stock into lengths that are notched in appropriate locations for assembly into grids for incorporation into the insulating glass units.

The residential window and door industry has witnessed an increased demand for internal decorative muntin bars contained in insulated glass (IG) units of their windows. This market demand for muntin bars has increased due to popular "colonial look" trends in the market which has increased the demand for simulated wood grain finishes for muntin bars. Also contributing to the demand are new construction and residential building codes requiring a common facade in local neighborhoods. With people also desiring differentiation and designer choices in their windows, a demand for so-called "two tone" muntin bars is on the rise. The two tone muntin bar present one appearance from the outside and a second appearance from inside the window.

Two-tone muntin bars are offered today in many color combinations for both rectangular and contour style muntin bars. A two-tone muntin bar demands a premium price in the market place. One reason for the increased price of two tone muntin bars is the fact that automated manufacturing of two tone muntin bars using controlled notching, roll forming and severing has not occurred.

The most common method practiced at the present time for manufacturing two tone muntin grids starts with a long roll formed bar that is often shipped to a secondary supplier that paints or laminates the bar with a solid color tone or pattern on one side and a second color or pattern on the opposite side. Use of multiple steps performed by multiple suppliers results in significant additional cost to the product. More elaborate bars have simulated wood grains that are used to match up with the wood trim in or surrounding the window sash. All of the current methods require cutting specified length segments from a two tone bar. This bar is then mitred and/or punched to complete fabrication of the muntin bar. The current methods require post painting and/or lamination which are time consuming, costly and provide limited throughput. This requirement also leads to a build up of inventory to give the suppliers adequate lead time for performing these post roll forming procedures.

SUMMARY OF THE INVENTION

The present invention concerns an automated method and apparatus for producing laminated muntin tailstock material before muntin bars are roll formed into either rectangular or contour muntin bars. In accordance with one process two tone muntin bars are provided that have one appearance when viewed from outside the window and a second appearance when viewed from inside the window.

An exemplary embodiment of the invention concerns a process for forming an elongated strip for use in making muntin bars. An elongated strip of muntin bar material is provided that has been treated on at least a portion of one side to define an exposed surface of a completed muntin bar fabricated from the muntin bar material. An elongated strip of covering material is also provided for controlled application onto a specified portion of a surface of the muntin bar material. The elongated strip of covering material includes an adhesive for adhering the covering material to the muntin bar material. The muntin bar material and the covering material are brought into contact with each other thereby causing the covering material to overlie and adhere to the muntin bar material.

One aspect of the invention is used in making muntin bars that are completely covered. An example of such a muntin bar includes a pattern, such as a simulated grain pattern, on both the inside and the outside of the window. The invention can also be used to make two tone muntin bars that present different appearances on the inside and outside of the window.

When making two tone muntin bars, one exemplary embodiment of the invention starts with an elongated strip of muntin bar material that has been painted on at least one side. A covering material is brought into contact with a painated surface of the muntin bar material. For the two tone application, the covering material covers one half of an exterior, painted surface of the muntin bar material to form a composite strip. When bent into a muntin bar one side of the muntin bar has a first appearance and a second side of the muntin bar has a second appearance.

Practice of the invention allows the laminated muntin bars to be produced on an as needed basis. A coil of strip that has been painted with an appropriate color is stored in inventory rather than a collection of fabricated muntin bars which must be shipped to a supplier and then shipped back to the window fabricator for inclusion in an IGU.

The disclosed embodiment of the invention uses a flexible elongated multilayer strip or foil of covering material that is applied to the painted surface of the muntin bar material. A first layer has an appearance which is visible on a muntin bar fabricated from the mutlilayer strip. A second adhesive layer causes the first, appearance defining layer to adhere to a strip of muntin bar material. The foil also includes a carrier layer for supporting the first layer as the multilayer strip or foil is brought into contact with a muntin bar strip.

These and other objects, advantages and features of the invention will become better understood from a review of the exemplary embodiment of the invention which is described in conjunction with the accompanying drawings.

BRIEF DESCRIPTION OF THE DRAWINGS

FIG. 1 is a perspective view of an insulating glass unit including a muntin bar grid;

FIG. 2 is an enlarged perspective view of a portion of the muntin bar grid of the insulating glass unit of FIG. 1;

BEST MODE FOR PRACTICING THE INVENTION

Figure 3:
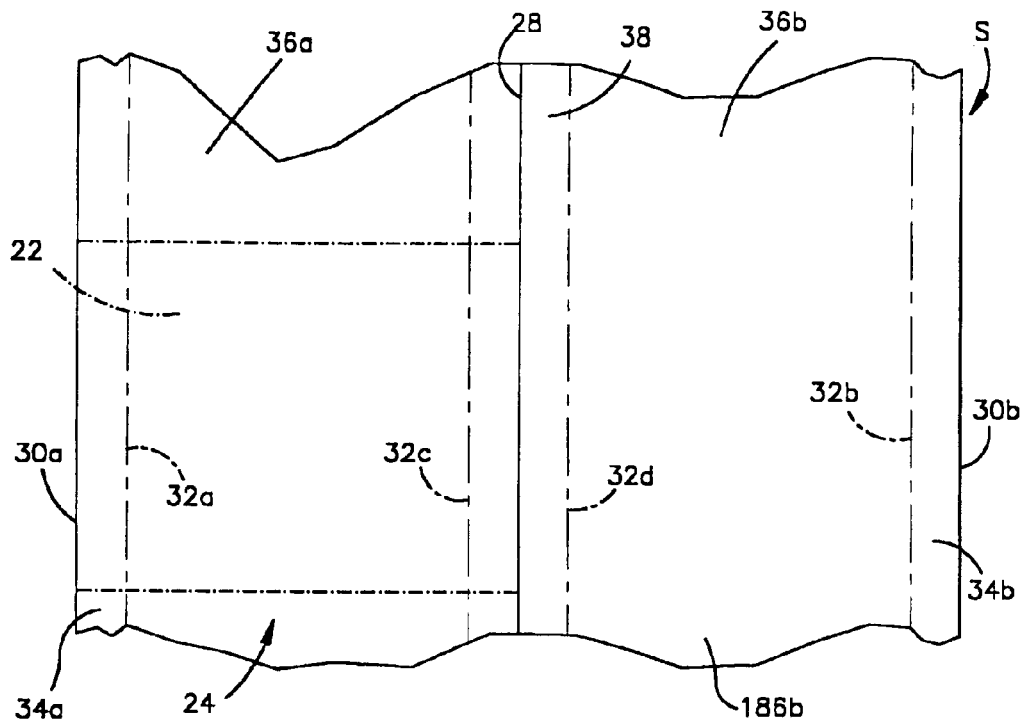
FIG. 3 is a plan view of a portion of stock material partially processed according to the invention.

FIG. 1 shows an insulating glass unit indicated generally by the reference numeral 10 comprising a spacer assembly 12 sandwiched between glass sheets, or lights, 14. The spacer assembly 12 includes a frame assembly 16 hermetically joined to the glass lights by a sealant 18 to form a closed dead air space 20 between the lights. The unit 10 is illustrated in FIG. 1 is in condition for assembly into a window or door frame (not shown).

A muntin bar grid indicated at G is disposed between the glass lights to provide the unit 10 with the appearance of a multi-pane window. As seen in FIG. 2, the illustrated grid G is comprised of muntin bars M having mating notches 22 interfitted at an intersection I. In certain instances the bars M are secured together by a suitable adhesive indicated at A, but a more common technique secures together two muntin bars with a flexible cross shaped clip that extends a short distance into each of the two intersecting muntin bars M. The ends of the muntin bars M are secured to the interior of the spacer frame 16 by suitable fasteners as is known in the art.

FIG. 3 shows a length of a strip S of stock material that is to be formed into a muntin bar M according to the invention. An outer surface 24 of the strip S is painted to have a desired color. This first color is the color presented to an observer from one side of the completed insulating glass unit 10. The strip S is made from a thin elongated metal, for example, aluminum or steel that can be wound into an elongated strip as disclosed in the pending patent application to McGlinchy et al. noted above. The two tone appearance of the muntin bar M is achieved by applying a coating or covering layer 150 (FIG. 6) to one side of the strip. The process for applying this coating is described in greater detail below.

According to the fabrication process disclosed in the McGlinchy et al. patent application, the strip S is fed lengthwise through a muntin bar production line including a series of forming stations and is formed into a muntin bar M having a notch 22 for interfitting with the notch of another muntin bar. The strip S (FIG. 3) includes opposite edges 30a, 30b that, along with fold lines 32a, 32b, define a pair of end panels 34a, 34b. The fold lines 32a, 32b, along with fold lines 32c, 32d, define a pair of intermediate panels 36a, 36b. The fold lines 32c, 32d define a central panel 38. The notch 22, shown in phantom, extends inward from edge 30a of the stock material illustrated in FIG. 3 to the centerline 28. In an embodiment described in more detail below, one half of the stock material S is covered to produce a different muntin bar appearance on opposite sides of the completed IG unit. For this embodiment, the notch 22 must, for some of the interfitting bars, extend inward toward the stock centerline from the edge 30b rather than the side 30a shown in FIG. 3 so that the completed muntin bar grid has an appropriate appearance.

Figure 4:
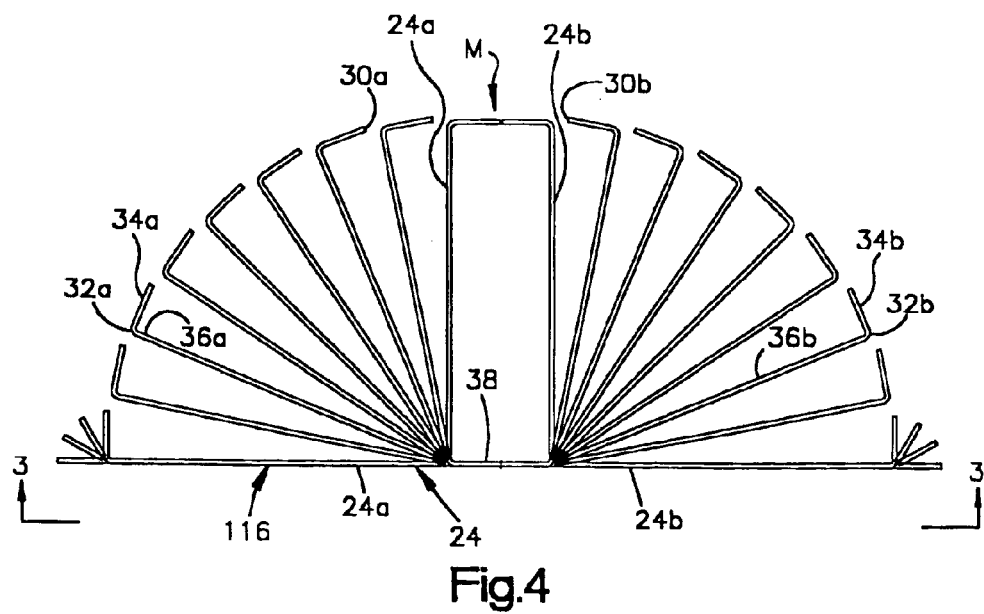
FIG. 4 is an elevation view schematically illustrating forming the stock material of FIG. 3 into a muntin bar.

FIG. 4 schematically indicates a progressive change in the shape of the strip S from a flat strip to a rectangular cross section structure as the strip passes through a multiple stage roll forming apparatus (not shown). The strip S is bent in the region of the fold lines 32a, 32b, 32c, 32d to form an enclosed structure having rectangular borders as seen from the end. When severed from the end of the strip S this structure forms a muntin bar M that is interfitted with one or more other bars to form a grid G such as the grid of FIG. 1.

As can be seen in FIG. 4, the muntin bar M includes an outer surface 24. The outer surface 24 includes a first outwardly facing half portion 24a that would be visible to a person looking through the IG unit 10 from one side of the unit 10 and a second outwardly facing half portion 24b that would be visible to a person looking through the IG unit 10 from the opposite side of the unit. In one embodiment of the present invention, an outer surface 24 of the strip S is painted or otherwise treated to have a first appearance and a portion of the outer surface 24, approximately half its width, is covered with the coating layer 150 having a second appearance.

Figure 7:
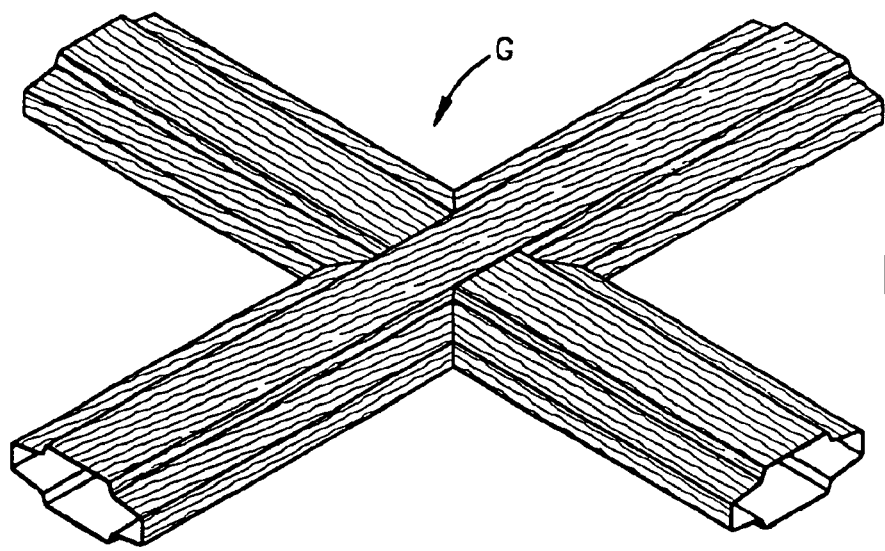
FIG. 7 is a perspective view of a contour muntin bar that includes a lamination for achieving a wood grain appearance on both sides of the muntin bar.
Figure 8:
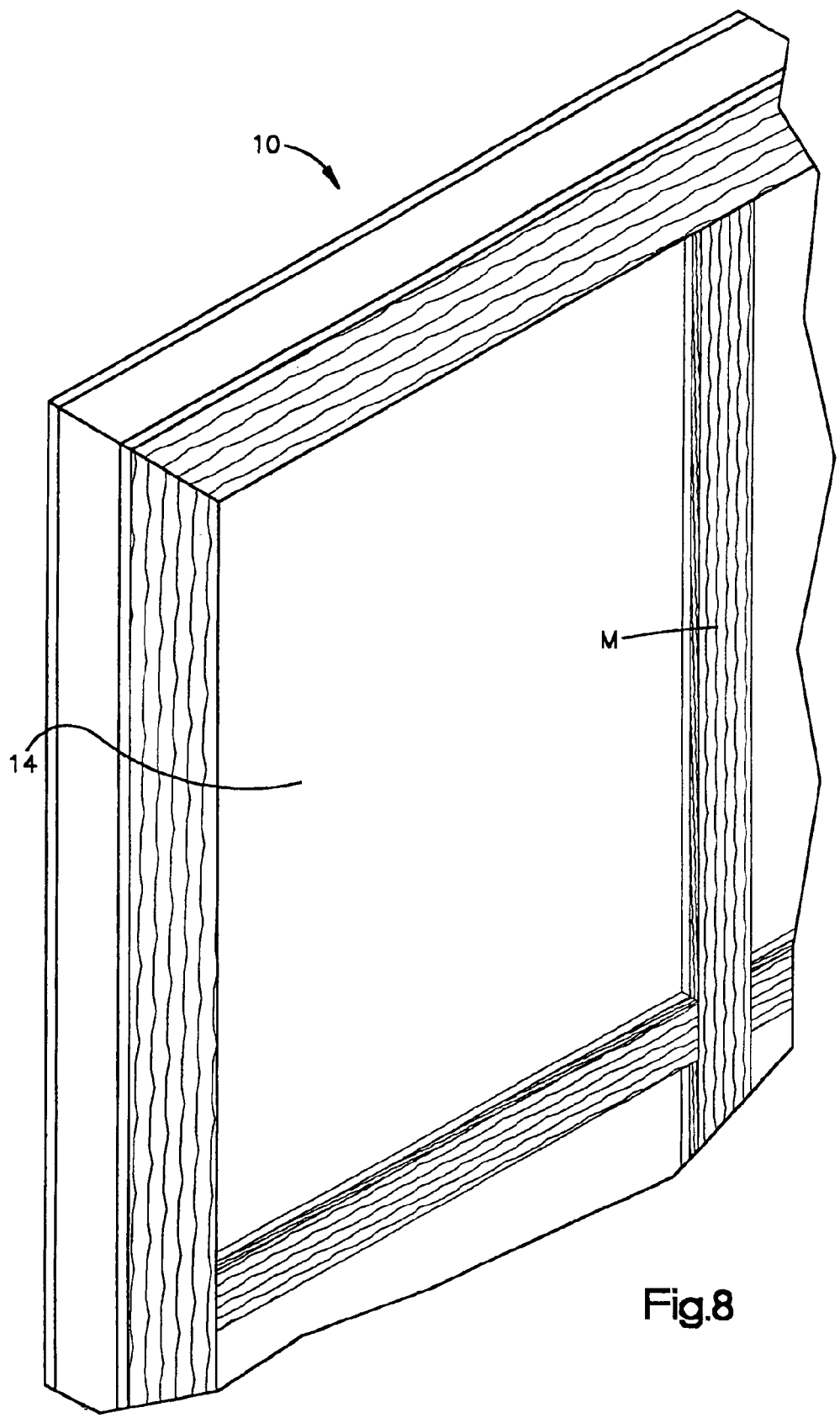
FIG. 8 is an enlarged perspective view of a portion of an insulating glass unit having a laminated muntin bar fabricated in accordance with the present invention.

Bending of the strip S as depicted in FIG. 4 produces a two tone muntin bar M, that is, a muntin bar that has the first appearance on the outwardly facing surface 24a and the second appearance on the outwardly facing surface 24b. The enlarged perspective view shown in FIG. 8 shows such an insulating glass unit 10. Alternatively, the outer surface 24 of the strip S is completely covered with the coating layer 150. A contour muntin bar grid G is depicted in FIG. 7 having coating over the entire surface so that subsequent to a roll forming process described in the McGlinchy et al patent application entitled "System for Fabricating Contour Muntin Bars from Sheet Material" the entire outer surface of the muntin bars that make up the grid G is covered with a wood grain simulated finish.

Figure 5:
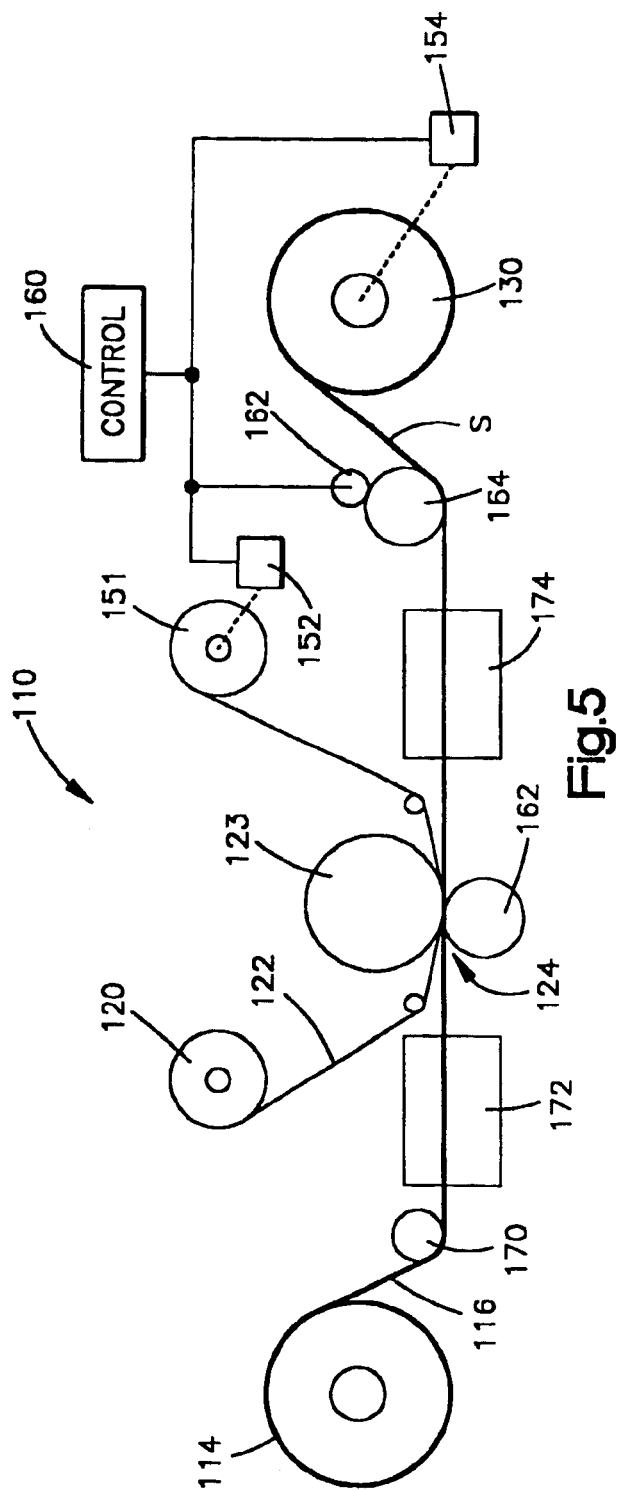
FIG. 5 is a schematic depiction of a process for forming an elongated coiled strip of material from which a two tone muntin bar can be fabricated.

FIG. 5 discloses a system 110 for fabricating an elongated strip S for use in making two tone muntin bars M such as the bars depicted in FIG. 2. A first rotatably mounted supply 114 unwinds a first elongated strip 116 of flexible muntin bar material that is a first constituent component of the strip S. The strip 116 has been treated on at least one side to define an exposed surface 24 of a completed muntin bar that is fabricated from the strip S. In the exemplary embodiment of the invention, the strip 116 is treated by painting.

In an exemplary embodiment of the invention, the paint applied to the surface 24 is a thermoplastic polyester base formulated to inhibit the offgassing of any volatile contaminants created in the process of fabricating IG units and thus will not fog when processed through high energy infrared ovens used to fabricate IG units. Suitable paints may be obtained under the tradename "Specialty Super Series 1000" from Specialty Coating Company, Inc. of Elk Grove Village, Ill. 60007. Physical properties of this paint are listed below:

| Viscosity @ 77 degrees F. | 25–30 SEC |
|---|---|
| Viscometer: | #4 Zahn |
| Weight/Gallon Range | 9.0–9.4 LBS |
| Coverage | 748 SQ.FT/Gal @ 50 mils |
| Non-Volatile Weight | 36–38% |
| Non-Volatile Volume | 22–24% |
| VOC Range | 5.71–5.91 lbs/Gal |
| HMIS Rating | 2-2-0-C |

In addition to the first elongated strip 116, the second constituent component of the strip S is a coating or covering material 150 that is applied onto a desired portion of the painted strip surface, i.e., one of the outwardly facing surfaces 24a or 24b of the painted strip surface 24. Prior to application to the strip surface 24, the covering material 150 is part of a second elongated strip or laminating foil 122 that is provided from a second rotatably mounted supply 120. Application or lamination of the covering material 150 onto a desired portion of the painted strip surface 24 involves use of heat and the application of pressure to achieve a transfer of the covering material 150 from the second elongated strip 122 onto the painted strip surface 24 as will be explained below.

Figure 6:
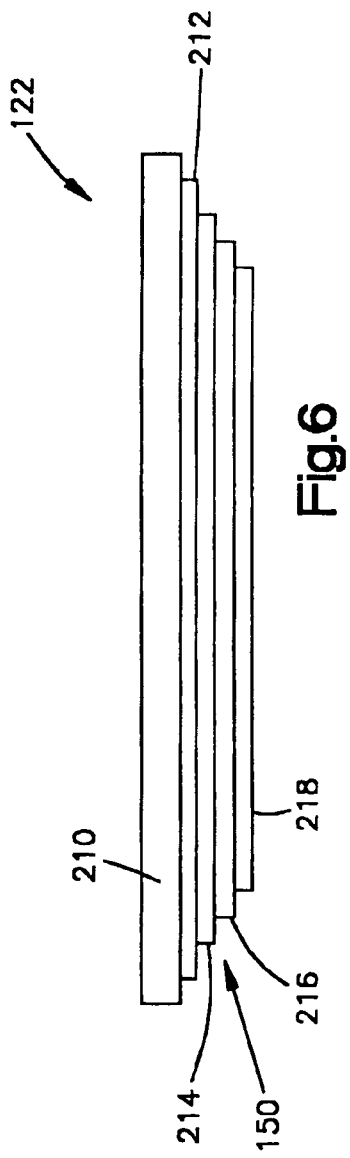
FIG. 6 is a schematic depiction showing a starting strip of material which is adhered to form a strip for manufacturing two tone muntin bars.

Turning to FIG. 6, the second elongated strip 122, sometimes referred to as a hot stamp lamination foil, comprises a carrier layer 210, typically a polyester film, which provides a backing or substrate for the strip 122. A release layer 212 is adhered to the carrier layer 210 and, in turn, the covering material 150 is adhered to the release layer 212. The release layer 212 preferably is a lacquered resin with a low melting point. During the lamination or application process, when the strip 122 is sufficiently heated the release layer 212 melts thereby releasing or separating the covering material 150 from the carrier layer 210. Pressure applied causes the covering material 150 to be adhesively affixed to the painted strip surface 24.

In one exemplary embodiment, the covering material 150 is comprised of three layers: a decorative color or printed layer 216, a protective layer 214 and an adhesive layer 218. The protective layer 214 is optional, but depending on its composition, can protect the decorative color layer 216 from scratching, chemical attack and UV (ultra violet) fading.

The decorative color layer 216 may be a desired paint color or a printed image, e.g., a wood grain finish appearance. The decorative color layer 216 is typically an ink lacquer which dries very rapidly by release of solvent. After application of the covering material 150 to the painted strip surface 24, the protective layer 214 functions as an outer protective surface for the decorative color layer 216 to protect the color layer 216 from scratching, resists chemicals and reflects UV radiation.

The third component of the covering material 150 of the strip 122 is the adhesive layer 218. The adhesive layer 218 comprises an adhesive that is formulated for compatibility with the paint applied to the strip surface 24 as well as the decorative color layer 214. The adhesive layer 218 is typically comprised of a combination of resins (lacquers) that cure from applied heat and chemically cross link the decorative color layer 216 to the paint applied to the strip surface 24. Additionally, the adhesive layer 218 adheres to the strip surface 24 and is sufficiently elastic so that the elongated strip of stock material S can be rollformed without delamination of the covering material 150 or scratching either the covering material 150 or in the case of a two tone muntin bar scratching the painted outer surface of the bar. This roll forming results in either a rectangular cross section shaped muntin bars M as described above and shown schematically in FIG. 4 or in a contour muntin bar for forming a muntin bar grid G as depicted in FIG. 7.

Returning to FIG. 5, the system 110 for fabricating the elongated strip S from the first strip 116 of aluminum or steel and the covering material 150 released from the lamination foil 122 includes a drive system (discussed below) for simultaneously unwinding the muntin bar material 116 and the covering material 150 and bringing them into contact with each other to cause the covering material 150 to overlie and adhere to a portion of the surface 24 of the muntin bar material 116. In the disclosed exemplary embodiment of the invention the covering material 150 covers one half of the outwardly facing surface 24 of the strip 116, namely one of the surface portions 24a or 24b. A pressure roll 123 defines a nip 124 for applying pressure to a region of engagement between the muntin bar material strip 116 and the lamination foil 122.

Once the covering material 150 has been applied to a portion of the strip 116 resulting in the finished muntin bar strip S, the strip S is rewound onto a recoiler 130 downstream from the nip 124. From the recoiler 130 the coil strip of material is transported to a system such as that shown in the McGlinchy et al patent application for bending into the muntin bars. Alternatively, the processing station could be coupled directly to such a system for immediate processing of the strip S into muntin bars.

The covering material 150 of the lamination foil 122 is transferred onto the painted aluminum substrate 116 using heat and pressure. During the lamination process, the release layer 212 is melted and the carrier layer 210 separates from the covering material layer 150 that adhere to the strip 116. This leaves the layers 214, 216, 218 on one half of the outside surface of the strip S.

Downstream from the nip 124, the carrier layer 210 is rewound onto a recoiler 151 and the completed strip S is rewound onto the recoiler 130. The recoilers 150, 130 are driven by respective motors 152, 154 having output shafts coupled to their respective recoilers and whose speed of rotation is coordinated by a programmable controller 160. An optical encoder 162 positioned next to an idler roller 164 monitors movement of the strip S and allows the controller 160 to co-ordinate the speed of rotation of the two motors 152, 154 to a desired speed setpoint.

Figure 9:
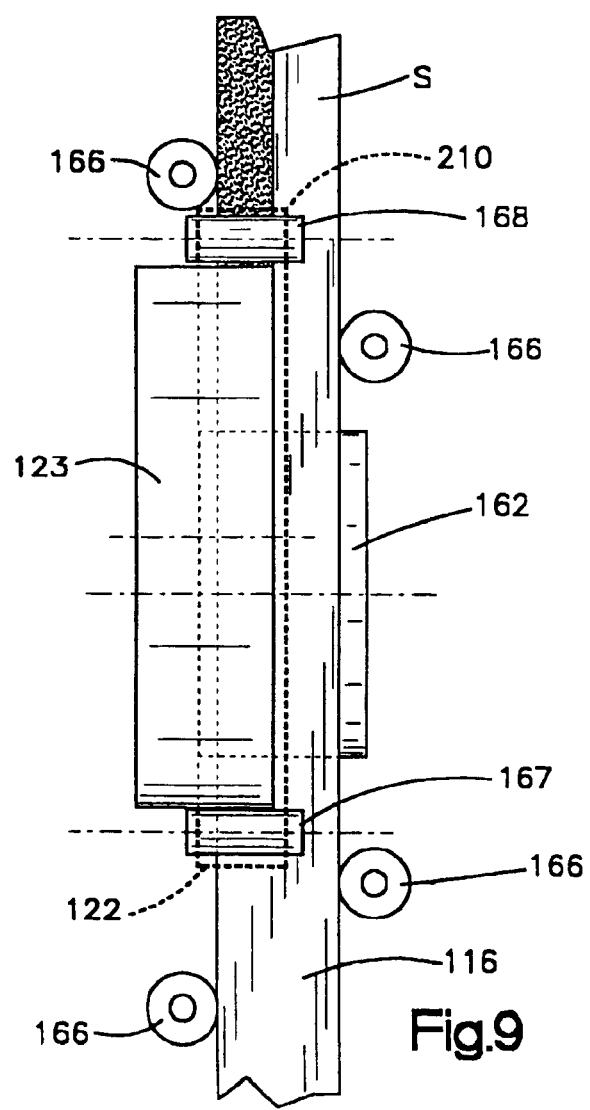
FIG. 9 is a top plan view of a region of a heat controlled pressure roller that forms a nip region.

Side to side alignment or registration is maintained between the two strips 116, 122 by guide rollers 166 (FIG. 9) that engage the side of the strip 116 after it has been unwound from the supply 114. These guide rollers 166 rotate about generally vertical axes and maintain the strip in side to side alignment near the pressure roll 123. The pressure roll 123 is a iron impregnated heat controlled silicon roll. The strip 122 is unwound from its supply 120 and reeved around a guide roller 167 for the laminating foil 122. The foil 122 and strip 116 are brought together at the nip between the pressure roll 123 and the steel backing roller 162. On the exit side of the nip 124 the carrier layer passes over a guide 168 and rewound on the coil 151. The pressure roll 123 is mounted for side to side movement so that for a strip S such as the one shown in FIG. 9, the pressure roll 123 only contacts the laminating foil 122. The pressure roll 123 also provides a position adjustment to allow adjustment of the position of the lamination edge.

The pressure roll 123 is biased against a fixed nip defining roll 162 mounted for rotation along a path of travel for the strip 116 and lamination foil 122. The pressure roll 123 is a heat controlled iron impregnated silicone roller. Before reaching the nip 124, the strip 116 is directed by a strip guide roller through a controlled preheat chamber 172 to preheat the strip 116. Preheating the strip 116 facilities proper adhesion of the adhesive layer 218 to the painted surface to produce high quality lamination at high speeds (greater than 10 feet per minute). The heating cross links bonding between the decorative color layer 216 and the painted strip surface 24. Downstream of the nip 124 is a cooling tunnel 174 for cooling the temperature of the fabricated muntin bar strip S prior to recoiling the strip S, so the strip does not stick to other layers when rewound.

Experience with the lamination process has identified ranges of operating parameters for use in practicing the invention. It has been found that the preheat chamber 172 should raise the temperature of the strip 116 to approximately 200 degrees F. at an exit from the chamber 172. Performance has been seen to be adequate when the temperature is within a range of 190 degrees to 210 degrees. At the nip 124 the temperature of the pressure roll 123 has been adquate when maintained at about 400 degrees F. The cooling tunnel 174 most preferably drops the temperature of the strip S to a temperature in a range of from 120 degrees F.–150 degrees F. Throughputs of between ten and fifty feet per minute have been achieved through practice of the invention and even higher throughputs may be achievable.

While the present invention has been described with a degree of particularity, it is the intent that the invention include all modifications and alterations from the disclosed design falling within the spirit or scope of the appended claims.

What is claimed is:

1. A process for making muntin bars comprising the steps of:
   a) providing an elongated strip of muntin bar material that has been treated on at least a portion of one side to define an outer surface of a completed muntin bar fabricated from the muntin bar material;
   b) providing an elongated strip of covering material for controlled application onto a specified portion of the treated portion of the muntin bar material, said elongated strip of covering material including an adhesive for adhering the covering material to the muntin bar material; and
   c) bringing the muntin bar material and the covering material into contact with each other to cause the covering material to overlie and adhere to the muntin bar material and form an elongated strip of stock material which is subsequently bent to form a muntin bar.

2. The process of claim 1 additionally comprising applying a coating to the elongated muntin bar material by painting the elongated muntin bar material on said one side prior to bringing the covering material into contact with a painted portion of said one side of the muntin bar material.

3. The process of claim 1 wherein the elongated strip of covering material is a multilayered foil and wherein one layer is an adhesive, a second layer is a plastic film carrier, and a third layer is a release layer and further comprising the step of applying a controlled pressure as the multilayered foil is brought into contact with the muntin bar material to cause the adhesive layer to bond to the muntin bar material.

4. The process of claim 3 additionally including applying heat to a region of contact between the covering material and the muntin bar material.

5. The process of claim 4 wherein the muntin bar material is a flexible metal strip of material that is unwound from a coil and then moved through a heating zone prior to bringing the covering material into contact with the said flexible metal strip.

6. The process of claim 5 wherein a combined strip of flexible metal strip and adhering covering material is moved through a cooling region downstream from a region wherein the covering material is applied to the metal strip.

7. The process of claim 6 wherein a combined strip of flexible metal strip and adhering covering is wound onto a supply downstream from the cooling region.

8. The process of claim 2 wherein one entire side of the elongated muntin bar material is painted to provide a painted surface and wherein one half of said painted surface is covered with the elongated strip of covering material to form a two tone muntin bar strip.

9. The process of claim 4 wherein the applying of heat is performed by a heated contact roll that also applies pressure to a region of engagement between the elongated strip of muntin bar material and the elongated strip of covering material.

10. The process of claim 1 wherein the elongated strip of stock material is roll formed to form a rectangular muntin bar.

11. The process of claim 1 wherein the elongated strip of stock material is roll formed to form a contour muntin bar.

12. The process of claim 1 wherein one complete surface of the stock material is covered with the covering material to define an outer appearance for both sides of a roll formed muntin bar.

13. A process for making elongated stock material for fabrication into muntin bars comprising the steps of:
   a) providing an elongated strip of muntin bar material that has been treated on at least a portion of one side to define an outer surface of a completed muntin bar fabricated from the muntin bar material;
   b) providing an elongated strip of covering material for controlled application onto a specified portion of the treated portion of the muntin bar material, said elongated strip of covering material including an adhesive for adhering the covering material to the muntin bar material; and
   c) bringing the muntin bar material and the covering material into contact with each other to cause the covering material to overlie and adhere to the muntin bar material and form an elongated strip of stock material which is subsequently bent to form a muntin bar.

14. The process of claim 13 additionally comprising applying a coating to the elongated muntin bar material by painting the elongated muntin bar material on said one side prior to bringing the covering material into contact with a painted portion of said one side of the muntin bar material.

15. The process of claim 14 wherein one entire side of the elongated muntin bar material is painted to provide a painted surface and wherein one half of said painted surface is covered with the elongated strip of covering material to form a two tone muntin bar strip.

16. The process of claim 13 wherein the elongated strip of covering material is a multilayered foil and wherein one layer is an adhesive, a second layer is a plastic film carrier, and a third layer is a release layer and further comprising the step of applying a controlled pressure as the multilayered foil is brought into contact with the muntin bar material to cause the adhesive layer to bond to the muntin bar material.

17. The process of claim 16 additionally including applying heat to a region of contact between the covering material and the muntin bar material.

18. The process of claim 17 wherein the muntin bar material is a flexible metal strip of material that is unwound from a coil and then moved through a heating zone prior to bringing the covering material into contact with the said flexible metal strip.

19. The process of claim 18 wherein a combined strip of flexible metal strip and adhering covering material is moved through a cooling region downstream from a region wherein the covering material is applied to the metal strip.

20. The process of claim 19 wherein a combined strip of flexible metal strip and adhering covering is wound onto a supply downstream from the cooling region.

21. The process of claim 17 wherein the applying of heat is performed by a heated contact roll that also applies pressure to a region of engagement between the elongated strip of muntin bar material and the elongated strip of covering material.

22. A process for making muntin bars, comprising:
  a) providing an elongated strip of muntin bar material that has been treated on at least a portion of one side to define an outer surface of a completed muntin bar fabricated from the muntin bar material;
  b) providing an elongated strip of covering material for controlled application onto a specified portion of the treated portion of the muntin bar material, said elongated strip of covering material including an adhesive for adhering the covering material to the muntin bar material;
  c) bringing the muntin bar material and the covering material into contact with each other to cause the covering material to overlie and adhere to the muntin bar material and form an elongated strip of stock material;
  d) defining a notch that extends inward from an edge of said stock material; and,
  e) roll forming the stock material to form a muntin bar having a notch for interfitting with a notch of a second muntin bar.

23. The method of claim 22 wherein said notch of the second muntin bar is defined by a notch that extends inward from a second edge of said stock material.

24. A process for making a muntin bar grid, comprising:
  a) providing an elongated strip of muntin bar material that has been treated on at least a portion of one side to define an outer surface of a completed muntin bar fabricated from the muntin bar material;
  b) providing an elongated strip of covering material for controlled application onto a specified portion of the treated portion of the muntin bar material, said elongated strip of covering material including an adhesive for adhering the covering material to the muntin bar material;
  c) bringing the muntin bar material and the covering material into contact with each other to cause the covering material to overlie and adhere to the muntin bar material and form an elongated strip of stock material which is subsequently bent to form a muntin bar;
  d) defining a first notch that extends inward from a first edge of said stock material;
  e) defining a second notch that extends inward from a second edge of said stock material;
  f) roll forming said elongated strip of stock material to form an enclosed structure;
  g) severing said enclosed structure to form a first muntin bar that includes said first notch and a second muntin bar that includes said second notch; and,
  h) interfitting said first notch and said second notch to form a muntin bar grid.

* * * * *